F. S. DOUGANS.
CREAM REMOVER.
APPLICATION FILED OCT. 6, 1915.
1,183,635.
Patented May 16, 1916.
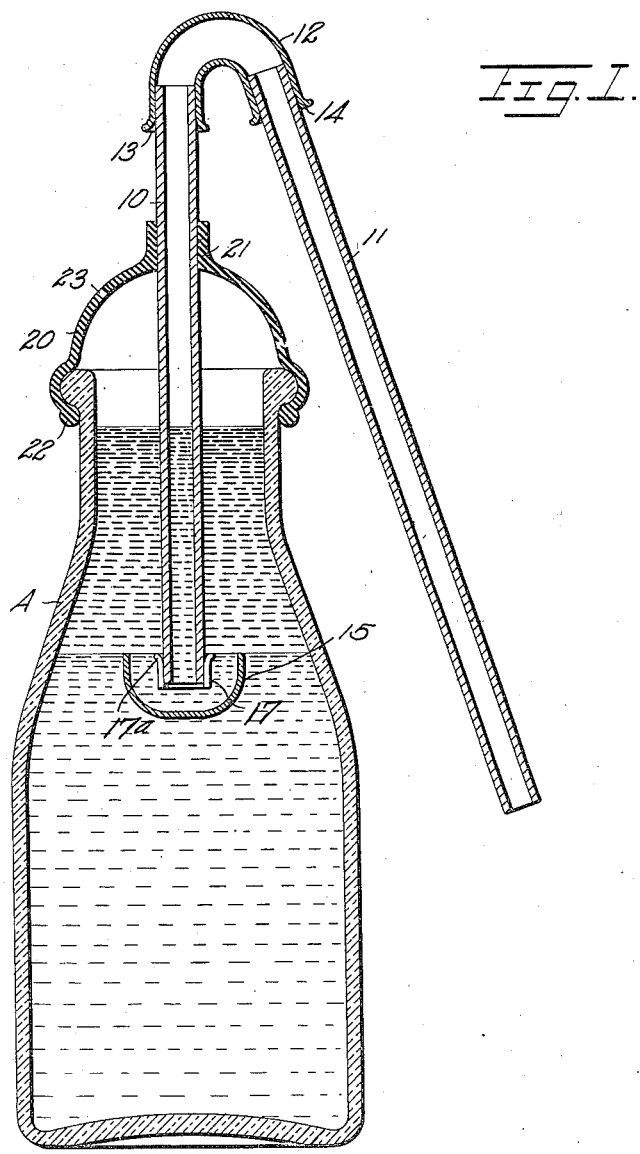
Fig. I.
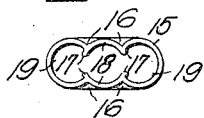
Fig. 2.
WITNESSES
H. J. Walker
INVENTOR
Frank S. Dougans
BY
ATTORNEYS

UNITED STATES PATENT OFFICE.

FRANK S. DOUGANS, OF CLINTON, MASSACHUSETTS.

CREAM-REMOVER.

1,183,635.  Specification of Letters Patent.  Patented May 16, 1916.

Application filed October 6, 1915. Serial No. 54,376.

*To all whom it may concern:*

Be it known that I, FRANK S. DOUGANS, a citizen of the United States, and a resident of Clinton, in the county of Worcester and State of Massachusetts, have invented a new and Improved Cream-Remover, of which the following is a full, clear, and exact description.

My invention relates to a device for household use in siphoning cream from milk bottles.

The prime object of my invention is to provide a cream remover of the indicated character improved in various particulars, more especially from a sanitary point of view, and to the end that efficiency in operation may be relied upon.

In my improved construction, siphon legs are designed for a single service to be then discarded in the interest of sanitation. Also, the other elements entering into the structure are of a character to be cleaned with thoroughness and facility.

The invention will be particularly explained in the specific description following.

Reference is to be had to the accompanying drawings forming a part of this specification in which similar reference characters indicate corresponding parts in all the views.

Figure 1 is a vertical section of a cream remover embodying my invention showing same in use on a milk bottle; and Fig. 2 is a plan view of the cream inlet cup to be employed on the shorter leg of the siphon.

In producing a practical embodiment of the invention as illustrated, a short siphon leg 10, is provided and a separate longer leg 11. The two siphon legs are in the form of straight tubes which are formed from waxed paper or equivalent cheap material that will make it feasible to employ the siphon legs for a single service to be then discarded and replaced by unused clean siphon legs. The upper ends of the siphon legs 10 and 11, are connected by a U-bend or goose-neck coupling 12, the terminals 13, 14 of which are slightly flared to readily receive and guide the paper legs 10, 11, without danger of crushing the same. On the lower end of the short leg 10, a cream inlet cup 15, is detachably secured. It will be seen from Fig. 2 that the side walls of the cup 15, are indented as at 16, to produce vertical ribs or beads 17, in opposite side walls at each side of the center of the cup. The walls 18, between the ribs 17, are concave so that the opposite walls with the beads 17, forming the side edges thereof, will constitute a socket which snugly receives the lower end of the siphon leg 10, whereby to detachably sustain the cup 15, on the siphon. The upper ends of the beads 17, are deflected laterally in opposite directions toward the ends of the cup; the walls 18 are similarly flared whereby to form a flaring entrance for the siphon leg. The cup 15, is oblong and each end 19, is open at the top, thereby forming inlets for the cream, said inlets being in communication with the siphon leg. The ribs 17 and walls 18, terminate above the bottom of the cup 15, to sustain the siphon leg above the bottom of the cup and to provide a free passage for the cream to the siphon. On the siphon leg 10, is a dome-shaped cup 20, of resilient rubber, which is formed with a neck 21, at the center, which fits air-tight on the said siphon leg. The lower edge 22, of the cap 20, is adapted to be stretched over the neck of a milk bottle *a* as indicated in Fig. 1. In the dome at a side thereof, is a vent-hole 23.

In use the device having been applied to a milk bottle, the resilient cap 20, may be collapsed, the hole 23, being closed by a finger of the operator so that a compression of the air beneath the cap will be produced sufficiently to start the siphon action. The cap 20, will have been placed sufficiently above the cup 15, to dispose the upper edge of the said cup at the bottom of the layer of cream. The siphon action having been started, it will be seen that the cream will be taken at the bottom. When the device has been used the siphon legs 10, 11, may be readily detached from the U-bend 12, and the cup 15, and the cap 20, removed from the leg 10. The elements 12 and 20, it will be seen, are of such form that they may be thoroughly cleaned with facility so that with the discarding of the siphon legs and the replacing of the same by unused legs, the device will be in sanitary condition. Any suitable material may be employed for the making of the coupling 12, and cup 15, aluminum being preferably used for the purpose. The form of the cup 15, enable it to be produced cheaply and insures the maximum strength as well as a free flow of the cream to the siphon leg.

Having thus described my invention, I claim as new and desire to secure by Letters Patent:

1. In a cream remover adapted for application to a milk bottle and including a short siphon leg, a separate longer siphon leg, both formed of waxed paper, a U-bend detachably coupling the said legs at the upper ends and formed with flaring terminals to facilitate the entrance of the siphon legs without crushing the latter in renewing said legs, a cream inlet cup removably fitting the lower end of the shorter siphon leg, and means on the said shorter leg above the inlet cup adapted to secure the siphon to a bottle neck.

2. A cream remover, including a siphon, a cap on the shorter leg of the siphon, adapted to fit over a bottle neck, and an oblong cream inlet cup having interior ribs in its opposite side walls at each side of the center, the walls between the ribs being concave and forming with the ribs, a socket open at the sides and bottom and terminating above the bottom of the cup, the upper ends of the ribs being flared, said socket detachably receiving the lower end of the shorter leg of the siphon, the ends of the cup presenting inlet openings at the top in communication with the lower end of the said socket.

In testimony whereof I have signed my name to this specification in the presence of two subscribing witnesses.

FRANK STEVENSON DOUGANS.

Witnesses:
ALBERT E. JEWETT,
D. F. LATIN.